April 23, 1957  G. YOUSSOV  2,789,341
CERAMIC REFRACTORY PRODUCTS
Filed Sept. 28, 1951
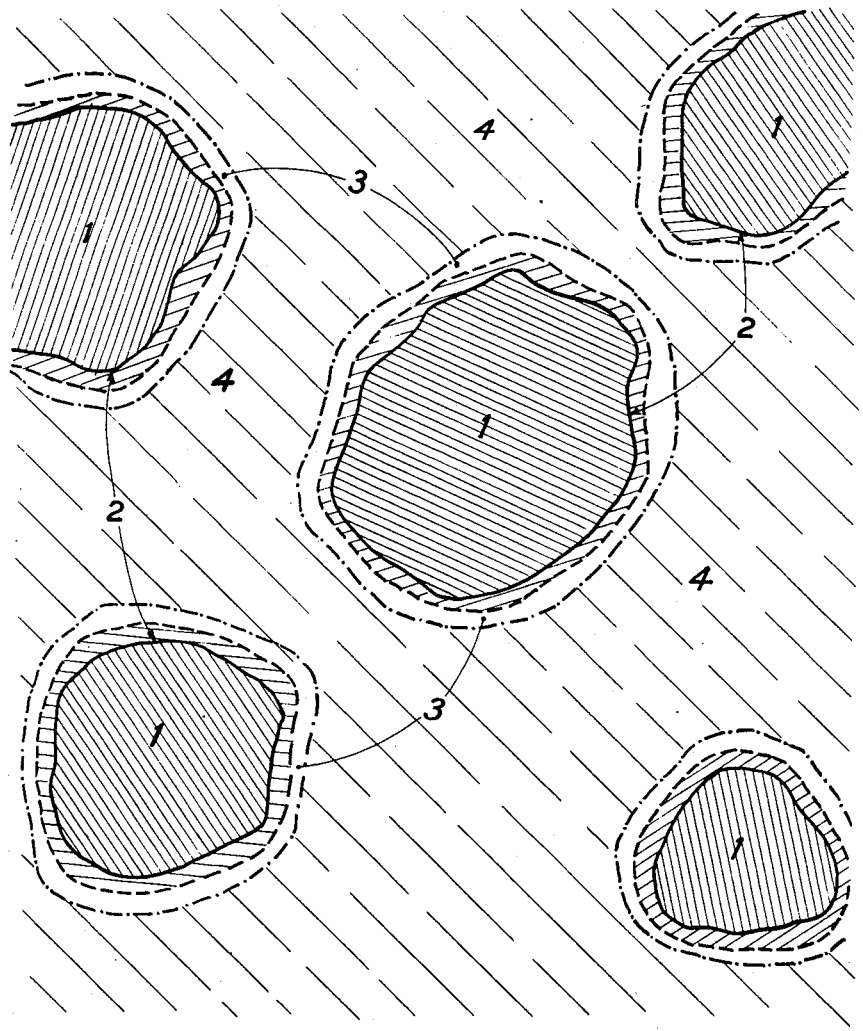
INVENTOR
Georges Youssov
By
Agent : 2,789,341
Patented Apr. 23, 1957

2,789,341

CERAMIC REFRACTORY PRODUCTS

Georges Youssov, Paris, France, assignor to Compagnie Generale de Telegraphie Sans Fil, a corporation of France Application September 28, 1951, Serial No. 248,754

Claims priority, application France October 3, 1950

1 Claim. (Cl. 29—182.5)

The invention refers to ceramic products and more particularly to highly fireproof materials which present the following particular thermal properties:

A good thermal conductibility.

A high resistance against thermal shock.

Good mechanical properties at high temperature particularly a good resistance against bending and compression.

Owing to the above mentioned properties, the materials, object of the present invention, are intended to be used in the making of blast pipes, nozzles, reaction chambers for reaction engines particularly of the "rocket" type. These pieces being brutally subjected to a gaseous stream of high velocity, reaching temperatures of the order of 2000–3000° C. and pressures suddenly rising to several tens of kilograms/cm.$^2$, the coating of ceramic material which is placed in direct contact with the hot gases, should resist the every brutal thermal shocks due to the velocity of the ejected gases, as well as the very high pressures, more particularly in the constricted part of the blast pipe.

The ceramic materials, object of the invention, may also be used for the making of elements of gas turbines, and particularly paddles for turbo-propellers and turbo-reactors. Of course, the ceramic materials above mentioned may also be used for the making of any other device, and for any other purposes.

A principal object of the present invention is to provide a new composition of ceramic materials, with a particular choice of the constituting bodies, and a particular distribution of the latter, in view of securing the required characteristics.

Other objects and advantages will be apparent from a consideration of the specification and claim.

According to the invention, the ceramic materials considered as finished products are characterized by the simultaneous presence of a fireproof oxide and a metal whose melting point is high and whose oxide is susceptible to come into reaction with the said fireproof oxide by chemically combining with it, and finally a certain content of material resulting from that reaction.

According to another feature, the product made in conformity with the invention might include several fireproof oxides and several metals or their alloys such as above defined.

According to the preferred embodiment of the invention the ceramic materials considered as finished products are characterized by the simultaneous presence of magnesia, of one metal belonging to the group of chrome such as Cr, Mo, W and U, and of the products of the chemical reaction of magnesia with the oxide of that metal.

These ceramic products can be considered as decomposing themselves into finely divided particles of the metal joined to the fireproof oxide particles by superficial coatings of the metal oxide and chemical composition produced by the reaction of the latter with the fireproof oxide.

The mode of preparation, according to the invention is characterized by mixing in the form of powder one or several metals or alloys recited above, whose proportion may vary from 5 to 60%, and one or several fireproof oxides characterizing the finished product, such as magnesia, whose proportion may vary from 95 to 40%. In the said mixture is included a convenient organic binder and the whole is subjected to the various operations of molding, pressing, extruding, manufacturing, so as to give it the desired shape.

Then, the shaped raw ceramic product must be subjected to a preliminary heat treatment by raising its temperature to between 500 and 1100° C., in an oxidizing atmosphere intended to eliminate the organic binder and superficially oxidize the metallic particles. The duration of this treatment is determined experimentally so as to ensure these two effects; a second heat treatment is effected at a higher temperature above 1300° C. which in most cases does not exceed 1700° C. and in an atmosphere which should preferably be neutral or reducing.

This second treatment allows the formation of chemical compounds produced by the reactions between the fireproof oxide and the metal oxide. Besides, it ensures the sintering of the aggregate. Its duration is experimentally determined so as to secure these conditions. The result is the ceramic material which is the object of the invention.

The fireproof oxide used should preferably satisfy certain conditions of shrinkage when burning, namely, its shrinkage should be situated between the limits of 5 to 25%.

Another embodiment of the mode of manufacturing according to the invention consists in effecting the second heat treatment in a carbon resistance furnace.

The invention will be better understood with the aid of the following detailed description which is accompanied by a single figure representing in a very enlarged view, a structure of the final product.

For making such materials, according to the invention, a mixture of two materials in powder form is used: the metal and the fireproof oxide. The mixture of powders is subjected to mixing with an organic binder such as soap, hydrocarbon, emulsion, etc. which can be completely eliminated by heat.

The paste so realized is pressed, extruded, or molded, and heated in such a manner as to obtain required shapes for the object intended to be made. A linear shrinkage during burning of about 5 to 25%, can be eventually taken into the consideration.

Then, the so shaped paste is subjected in controlled atmosphere to thermal treatments which should first eliminate the organic binder, allow the superficial oxidation of the metallic particles and finally, realize the properly so called "sintering" during which the fireproof oxide combines with the metal oxide by coating the particles of the latter.

I prefer to separate the said heat treatment into two distinct operations:

The first one is effected in oxidizing or feebly oxidizing atmosphere ($O_2$, $CO$, $CO_2$, $H_2O$ diluted in gases inactive with respect to the metal oxide such as $N_2$, Ar); it consists in subjecting the article, during a certain time, to a temperature which eliminates the organic binder and where the fireproof oxide begins to shrink. During this treatment, the metal particles are oxidized superficially, not too deeply, but enough to allow the formation of the junction coating (as shown in the figure) during the second phase of the heat treatment.

This second phase of the burning process (properly called "sintering") is effected in a neutral or more or less reducing atmosphere.

The applicant has ascertained that it was possible to effect the sintering operation in a furnace provided with carbon-resistance heaters.

The preparation of such ceramics requires the choice of the couple "fireproof oxide-metal" corresponding to the possibility of forming compounds defined by the reaction between the fireproof oxide and the metal oxide. Besides, every component of the materials according to the invention should have a melting point as high as possible, namely superior to 1100° C.

In many cases, such as the coating of blast pipes, the finished ceramic pieces should present very accurate dimensions required by the construction. Therefore, it is important to use a fireproof oxide whose shrinkage during burning is as feeble as possible. However, this condition risks to affect the quality of the sintered product with respect to the perfect cohesion of small ceramic-metal particles as shown on the annexed figure and finally to reduce the mechanical properties of the product.

It is of advantage to choose a compromise between the two conditions by using a fireproof oxide whose linear shrinkage lies between 5 and 25%. It is understood that this shrinkage should be measured on a shaped article constituted by the fireproof oxide, subjected substantially the same burning conditions as the compound "ceramic-metal" which comprises said oxide.

For making materials according to the invention it is possible to use refractory oxides as above referred to: only one of them, or a plurality in mixture, or also compounds of said oxides. The metallic component may be introduced in the powder mixture in powder form constituted by one or several metals as above referred to, or by their alloys.

It has been found that a particularly advantageous compound "ceramic-metal" is constituted by using in combination magnesia-chrome (or other metal of the chrome group, such as Mo (molybdenum), W (tungsten) and U (uranium)). Such a compound corresponds perfectly to the above mentioned definitions and the manufactured materials resulting therefrom present excellent properties. On the other hand, the use of magnesia is very advantageous and economical, this oxide being very cheap it is highly refractory and as its melting point is in the order of 2.800° C.

In some cases, alumina may be used as the fire-proof oxide when the article is intended to be used at temperatures not higher than 1800-2000° C. Alumina may be used, for instance, for gas turbine paddles. In that case, the chosen metal will be one of the metals of the iron group.

In my investigations, I have observed that the difference in the expansion coefficients of the components of the material according to the invention does not affect its good thermal properties.

In the accompanying drawings, a schematic and very enlarged sectional view through the material such as it is obtained after sintering has been represented. The metal particles are distributed in the mass of the refractory oxide 4. The junction between the metallic particles 1 and the refractory mass 4 is realized by a composite coating which includes, viewed on the direction from the metal surface to the mass of the fire-proof oxide, a coating of the metal oxides 2, followed by a coating 3 of chemical compounds produced by the reaction between 2 and 4. In the particular case of a material comprising a magnesia-chrome combination, the coating 2 contains chrome oxide $Cr_2O_3$ and possibly subsidiary oxides; the coating 3 contains compounds such as $MgO.Cr_2O_3$, $2MgO.Cr_2O_3$, etc.

It is understood that the mutual proportions of the substances 1, 2, 3 and 4 are represented on the figure only for indicative purposes; in fact they may vary within wide limits. Also, as a result of diffusion phenomena, the boundary lines between the parts 1, 2, 3 and 4 may become indistinct. Moreover, metallic particles which are given on the drawing a round shape may present any other shape.

More particularly, by choosing in an appropriate manner the manufacturing conditions of compounds "ceramic-metal" for instance by increasing the amount of metal and adjusting the temperatures, it is possible to produce metallic bodies of complex structure resulting in the junction of elementary particles by their welding. The ceramic mass then appears in the form of two structures or phases, which are continuous, and interleaved; one being formed by the metal and the other by the oxide.

The process above described results in a product presenting a structure as represented in the drawing. This structure is accomplished by the superficial oxidizing of the metal in a convenient atmosphere, this operation being combined with the elimination of the organic binder. The coating of the metallic oxide so realized will react upon the refractory oxide during the second heat treatment which produces the sintering, so as to form the second composite coating as desired.

I have found that said composition and structure including intermediate coatings between the metal and the fire-proof oxide, made of definite compounds, ensure the best mechanical properties when cold or when hot, as well as the maximum resistance to flexion and compression.

From a thermal point of view, the presence of metal particles regularly distributed in the mass of the fire-proof oxide, improves the thermal conductibility, allows a good conduction of heat and its good distribution in the material mass, a fact which secures to the latter an excellent resistance against thermal shock.

As particular numeric examples, the following ceramic materials according to the invention may be made by the following mixtures:

A. *Composition.*—60 parts of heavy industrial magnesia presenting a shrinkage of 16% when baking at 1500°; 40 parts of powdered chrome.

This mixture is made homogeneous in a suitable grinding device, then its particles are coated with 10% of "Ceresin" and then, this mixture is shaped by using a regulating pressure of 1 ton per cm.$^2$.

The articles are subjected to a preliminary baking with a slow rise of temperature up to 600° C. and with admission of air in the furnace, then air is replaced by industrial nitrogen and the preliminary baking is continued up to 1000° C. the latter being kept during 1 hour. The articles are cooled in a nitrogen flow. They are then submitted to the final sintering in an electric furnace using graphite heaters. The articles are placed in refractory boxes and the furnace is filled with industrial nitrogen. The heating may be faster than in the case of preliminary baking. The temperature is maintained at 1500° C. during half an hour.

The characteristics of the obtained materials are indicated in Table 1 below.

B. *Composition.*—60 parts of magnesia identical to the magnesia of Example A; 40 parts of powdered molybdenum.

The mixture is subjected to the operations of Example A.

During the preliminary baking it is convenient to replace air by nitrogen, when the temperature of 400° is reached.

C. *Composition.*—60 parts of magnesia identical to the magnesia of Example A; 40 parts of powdered tungsten, which are subjected to the operations of Example A.

During the preliminary baking the industrial nitrogen has been used from the starting of the operation.

| Composition | Thermal Conductivity | Resistance against thermal shock | Refractory Index, °C. | Resistance against Flexion At 1,000° C. in Kg./mm.$^2$ |
|---|---|---|---|---|
| MgO | 0.014 | bad | 2,800 | |
| MgO 60%, Cr 40% | 0.034 | good | 2,600 | 12 |
| MgO 60%, Mo 40% | 0.033 | good | 2,600 | 8 |
| MgO 60%, W 40% | 0.030 | good | 2,700 | 5 |

The scope of the invention is not limited to the theory above referred to which is given only for explanatory purposes.

What I claim is:

A cermet type article of good thermic conductivity, high resistance against thermic shocks and good mechanical properties at high temperatures in the range of 2000 to 3000° C., said article being formed by an intimate mixture of magnesia and at least one metal of the chromium group, said magnesia constituting from about 95% to 40% and said metal from 5% to about 60% of the article, the boundaries between said metal and said magnesia being formed by two superposed intermediate layers, the first of said layers covering the metal and being formed by the oxide of said metal, the second of said layers adjoining said magnesia and consisting of a double compound of magnesia with said metal oxide.

References Cited in the file of this patent

UNITED STATES PATENTS

| | | |
|---|---|---|
| 1,826,456 | Comstock | Oct. 6, 1931 |
| 2,294,756 | Inutsuka | Sept. 1, 1942 |
| 2,404,598 | Sachse | July 23, 1946 |
| 2,545,438 | Stumbock et al. | Mar. 20, 1951 |
| 2,568,157 | Lepp | Sept. 18, 1951 |

FOREIGN PATENTS

| | | |
|---|---|---|
| 883,630 | France | Mar. 29, 1943 |

OTHER REFERENCES

Hausner: Metal Industry, May 14, 1948, pages 405–407.

Johnson: Journal of the American Ceramic Society, vol. 33 No. 5, May 1950, pages 168 and 171.

Jones: Metal Powder Report, June 1950, pages 145, 142 and 153. Copy in Div. 3.